US009223352B2

(12) United States Patent
Smith et al.

(10) Patent No.: US 9,223,352 B2
(45) Date of Patent: Dec. 29, 2015

(54) ELECTRONIC DEVICE WITH ELECTROMAGNETIC SHIELDING

(71) Applicant: Apple Inc., Cupertino, CA (US)

(72) Inventors: Brandon S. Smith, Mountain View, CA (US); Matthew Casebolt, Fremont, CA (US)

(73) Assignee: Apple Inc., Cupertino, CA (US)

( * ) Notice: Subject to any disclaimer, the term of this patent is extended or adjusted under 35 U.S.C. 154(b) by 330 days.

(21) Appl. No.: 13/628,587

(22) Filed: Sep. 27, 2012

(65) Prior Publication Data

US 2013/0329396 A1 Dec. 12, 2013

Related U.S. Application Data

(60) Provisional application No. 61/657,476, filed on Jun. 8, 2012.

(51) Int. Cl.
*G01D 11/28* (2006.01)
*G06F 1/16* (2006.01)
(Continued)

(52) U.S. Cl.
CPC ............ *G06F 1/1656* (2013.01); *G06F 1/1662* (2013.01); *G06F 1/1698* (2013.01); *G06F 1/182* (2013.01); *H01H 13/704* (2013.01); *H04M 1/22* (2013.01); *H01H 2219/044* (2013.01); *H01H 2219/062* (2013.01); *H01H 2239/004* (2013.01)

(58) Field of Classification Search
CPC ... G06F 1/1616; G06F 1/1637; G06F 1/1662; G06F 3/0202; G06F 1/1613; G06F 1/203; G02B 6/0073; G02B 6/0088; H04M 1/22; H04M 1/23; H04M 1/0214; G02F 1/133615; G02F 1/1336; F21V 7/0008; G09F 13/18; F21Y 2101/02; H01H 13/14; H01H 3/125; H01H 13/702
USPC ................ 362/23.03, 23.15, 23.2, 84, 85, 88, 362/97.2, 97.3, 97.4, 310, 602, 612, 619; 361/679.08, 679.09, 679.55, 679.56, 361/816; 200/305, 310, 314; 345/168–170
See application file for complete search history.

(56) References Cited

U.S. PATENT DOCUMENTS 4,814,566 A 3/1989 Sigl
5,746,493 A * 5/1998 Jonsson et al. ................ 362/602
(Continued)

FOREIGN PATENT DOCUMENTS

JP 2006184347 A * 7/2006

*Primary Examiner* — Hargobind S Sawhney
(74) *Attorney, Agent, or Firm* — Treyz Law Group, P.C.; G. Victor Treyz; Joseph F. Guihan

(57) ABSTRACT

An electronic device may have a housing. Components such as keys may be mounted in openings in the housing. The housing may include a display housing portion and a base portion that are coupled using hinge structures. The keys may be used to form a keyboard in the base portion of the housing. Sensitive circuitry such as sensitive wireless circuitry may be shielded from electromagnetic interference by shielding the openings with a layer of conductive material. The layer of conductive material may be a metal layer that forms part of a reflector for a backlight structure. The backlight structure may be used to provide backlight for keys in the keyboard. The keyboard may include a support structure having openings through which the backlight passes to reach the keys. The openings may be bridged using conductive paths so that the support structure serves as a radio-frequency shielding structure.

17 Claims, 12 Drawing Sheets

(51) Int. Cl.
  *G06F 1/18* (2006.01)
  *H04M 1/22* (2006.01)
  *H01H 13/704* (2006.01)

(56) References Cited

U.S. PATENT DOCUMENTS

| | | | |
|---|---|---|---|
| 5,844,166 A | 12/1998 | Halttunen et al. | |
| 5,867,772 A * | 2/1999 | Jonsson et al. | 455/575.1 |
| 6,006,118 A | 12/1999 | Stephenson | |
| 6,011,699 A * | 1/2000 | Murray et al. | 361/814 |
| 6,026,283 A | 2/2000 | Stephenson | 455/575.1 |
| 6,252,159 B1 | 6/2001 | Anagnos | |
| 6,284,988 B1 * | 9/2001 | Watanabe et al. | 200/5 A |
| 6,304,458 B1 | 10/2001 | Mendolia | |
| 6,352,434 B1 * | 3/2002 | Emmert | 439/65 |
| 6,554,442 B2 | 4/2003 | Chou | 362/85 |
| 6,590,508 B1 * | 7/2003 | Howell et al. | 341/22 |
| 6,686,549 B2 * | 2/2004 | Douzono et al. | 200/341 |
| 7,057,125 B1 * | 6/2006 | Tsai | 200/310 |
| 7,388,167 B2 * | 6/2008 | Liao et al. | 200/310 |
| 7,460,362 B2 * | 12/2008 | Lam et al. | 361/679.27 |
| 7,525,056 B2 * | 4/2009 | Chiba et al. | 200/314 |
| 7,608,792 B1 * | 10/2009 | Tsai | 200/310 |
| 7,660,509 B2 * | 2/2010 | Bryan et al. | 385/146 |
| 7,810,961 B2 * | 10/2010 | Tsai et al. | 362/310 |
| 8,119,945 B2 * | 2/2012 | Lin | 200/314 |
| 8,139,349 B2 | 3/2012 | Lam et al. | |
| 8,142,036 B2 * | 3/2012 | Chung et al. | 362/26 |
| 8,742,276 B2 * | 6/2014 | Zhang | 200/520 |
| 2005/0057437 A1 * | 3/2005 | Sato | 345/4 |
| 2008/0068799 A1 * | 3/2008 | Chan | 361/697 |
| 2009/0122558 A1 * | 5/2009 | Tsai et al. | 362/310 |
| 2009/0179862 A1 * | 7/2009 | Strong, IV | 345/169 |
| 2010/0053883 A1 * | 3/2010 | Ali et al. | 361/679.46 |
| 2010/0128427 A1 | 5/2010 | Iso | |
| 2010/0288615 A1 * | 11/2010 | Mafune et al. | 200/5 A |
| 2011/0091051 A1 | 4/2011 | Thomason et al. | |
| 2011/0254775 A1 * | 10/2011 | Hsu | 345/170 |
| 2012/0012448 A1 * | 1/2012 | Pance et al. | 200/5 A |

\* cited by examiner

ELECTRONIC DEVICE WITH ELECTROMAGNETIC SHIELDING

This application claims the benefit of provisional patent application No. 61/657,476, filed Jun. 8, 2012, which is hereby incorporated by reference herein in its entirety.

BACKGROUND

This relates generally to electronic devices and, more particularly, to electromagnetic shielding structures for electronic devices.

Electronic devices such as cellular telephones and computers often contain circuitry that is sensitive to electromagnetic interference. For example, electronic devices often contain wireless transceiver circuitry that contains receiver circuits that are susceptible to radio-frequency interference. Radio-frequency interference can be generated by circuits on a logic board that is mounted within an electronic device housing.

During operation, radio-frequency interference signals may escape from within the electronic device housing. Signals that have escaped from within the device may be picked up by antenna structures and may cause interference to sensitive receiver circuitry that is coupled to the antenna structures. Metal housing structures with openings may sometimes exacerbate interference problems, because the openings may have sizes that give rise to undesired signal resonances.

It would therefore be desirable to be able to provide improved ways in which to reduce electromagnetic signal interference in electronic devices.

SUMMARY

An electronic device such as a computer may have a conductive housing. The conductive housing may be formed from aluminum or other metals. Openings may be formed in the conductive housing. The openings may be used to accommodate keyboard keys or other components.

To prevent signal interference, a conductive shielding layer may be used to cover the undersides of the openings and the components associated with the openings. The conductive shielding layer may be formed from a polymer layer coated with a layer of reflective metal. The conductive shielding layer may serve as a reflector for a light guide plate that is used to distribute backlight to keyboard keys in a keyboard. The conductive shielding layer may have a rectangular shape with a rectangular periphery. The conductive shielding layer may be connected to the conductive housing conductive adhesive around the rectangular periphery.

The electronic device may include a keyboard having buttons and a conductive support structure. The support structure may include openings through which light passes to reach the keyboard keys. The openings of the support structure may include bridging paths that help to block electromagnetic interference. The support structure may be electrically connected to an interior surface of the conductive housing along the periphery of the keyboard.

Further features of the invention, its nature and various advantages will be more apparent from the accompanying drawings and the following detailed description of the preferred embodiments.

BRIEF DESCRIPTION OF THE DRAWINGS

FIG. 8 is a perspective view of an illustrative backlight reflector having an opening that accommodates communications paths in accordance with an embodiment of the present invention.

DETAILED DESCRIPTION

Figure 1:
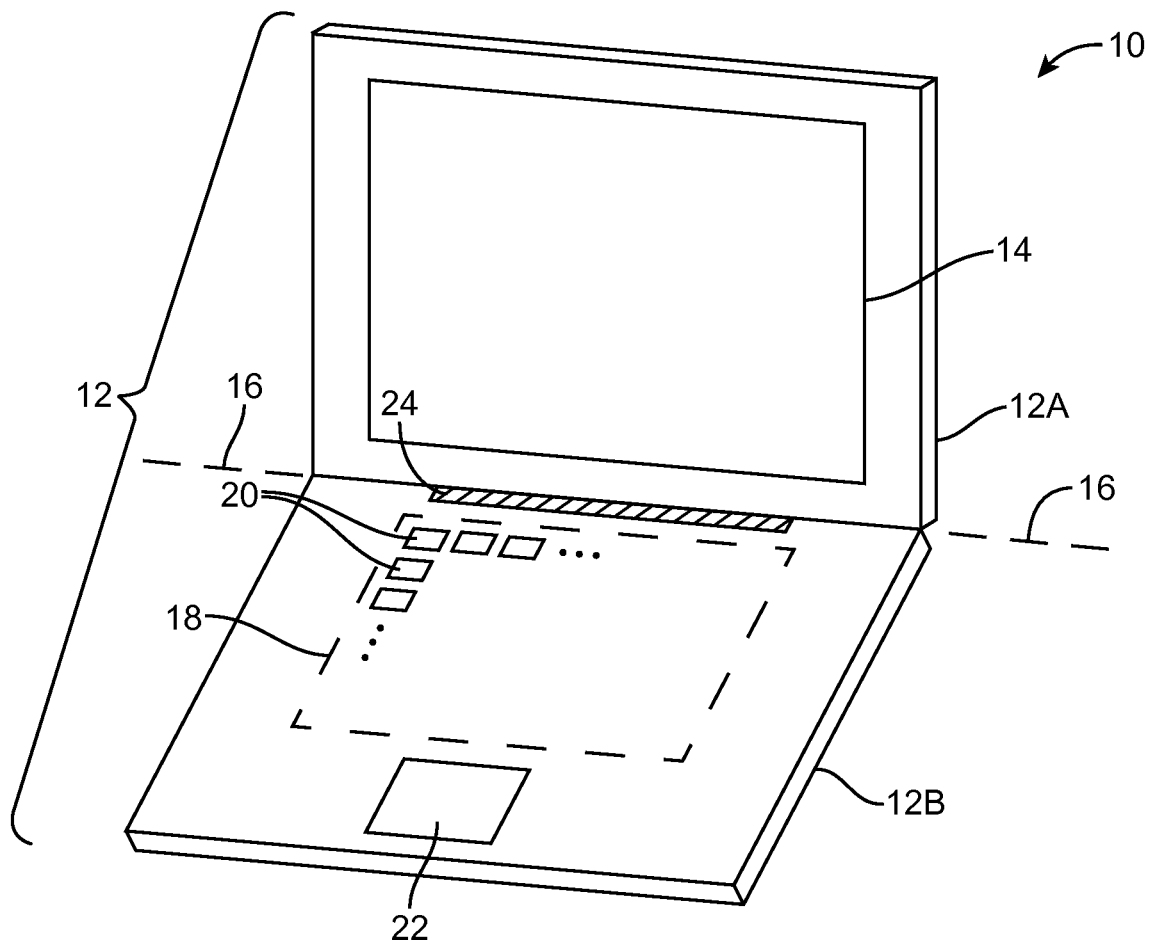
FIG. 1 is a perspective view of an illustrative electronic device that may be provided with electromagnetic shielding structures in accordance with embodiments of the present invention.

An illustrative electronic device of the type that may be provided with electromagnetic shielding is shown in FIG. 1. Electronic devices such as device 10 of FIG. 1 may be cellular telephones, media players, other handheld portable devices, somewhat smaller portable devices such as wrist-watch devices, pendant devices, or other wearable or miniature devices, gaming equipment, tablet computers, notebook computers, desktop computers, televisions, computer monitors, computers integrated into computer displays, or other electronic equipment. In the example of FIG. 1, device 10 is a portable electronic device such as a notebook computer, cellular telephone, media player, or other portable electronic devices (e.g., handheld electronic devices). This is merely an illustrative example. Electronic device 10 may, in general, be based on any suitable electronic equipment.

As shown in the example of FIG. 1, device 10 may include a display such as display 14. Display 14 may be mounted in a housing such as housing 12. Housing 12 may have an upper portion such as portion 12A and a lower portion such as portion 12B. Display 14 may be mounted in portion 12A, so portion 12A may sometimes be referred to as a display housing or lid. Portion 12B may sometimes be referred to as a base housing or keyboard housing.

Housing lid 12A may be joined with base housing 12B using hinge structures that lie along rotational axis 16. The hinge structures may allow housing lid 12A to rotate relative to base housing 12B about rotational axis 16. The hinge structures may be mounted in a portion of housing 12 such as clutch barrel 24. Clutch barrel 24 may also contain antenna structures. If care is not taken, radio-frequency signals that are produced by the internal components in device 10 may escape through openings in housing 12B and may be received as interference by the antenna structures in clutch barrel 24 and associated sensitive wireless receiver circuitry in device 10.

As shown in FIG. 1, device 10 may have components such as keyboard 18 and track pad 22. Keyboard 18 may include an array of keys 20 (e.g., a two dimensional array). Housing 12B may have openings that are configured to receive keys 20.

Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Configurations in which housing 12 (e.g., housing 12B and/or housing 12A) is formed from a metal such as aluminum are sometimes described herein as an example. Housing 12 may be formed using a unibody configuration in which some or all of housing 12 is machined or molded as a single structure or may be formed using multiple structures (e.g., an internal frame structure, one or more structures that form exterior housing surfaces, etc.).

Figure 2:
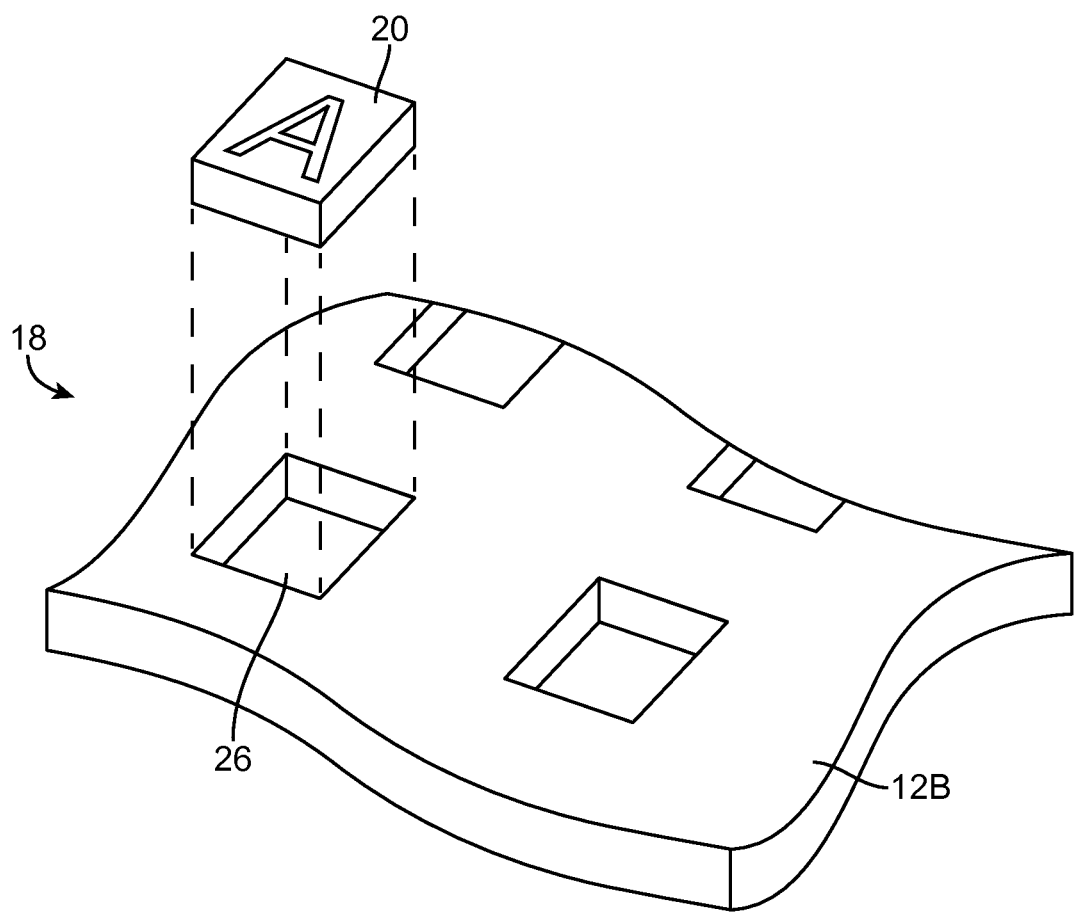
FIG. 2 is a perspective view of a conductive electronic device housing having an opening that receives a component such as a key for a keyboard in accordance with an embodiment of the present invention.

Housing 12 may have openings to accommodate components. As an example, housing 12B may have openings to accommodate keyboard keys. FIG. 2 is a perspective view of a portion of keyboard 18, showing how keys 20 may be received in openings 26 in housing 12B. Openings 26 have the potential to serve as pathways for electromagnetic interference signals. For example, circuitry that is mounted within the interior of device 10 has the potential to produce radio-frequency signals that can escape device 10 through openings 26.

Figure 3:
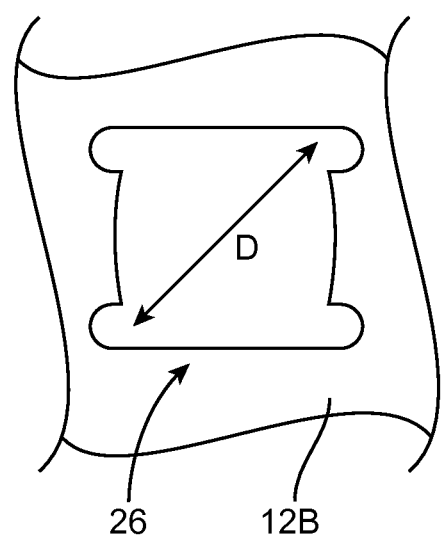
FIG. 3 is a top view of an illustrative keyboard key opening in an electronic device housing in accordance with an embodiment of the present invention.

As shown in FIG. 3, openings such as opening 26 may be characterized by lateral dimensions such as dimension D. In some situations, dimension D may have a magnitude that causes opening 26 to resonate and produce undesired interference (e.g., opening 26 may operate as a slot-type antenna resonating element). Emitted radio-frequency interference signals may be received by antenna structures in clutch barrel 24 and associated sensitive receiver circuitry. Other sensitive components in device 10 (e.g., communications circuits, display components, etc.) also have the potential to be adversely affected by radio-frequency interference passing through openings 26.

Figure 4:
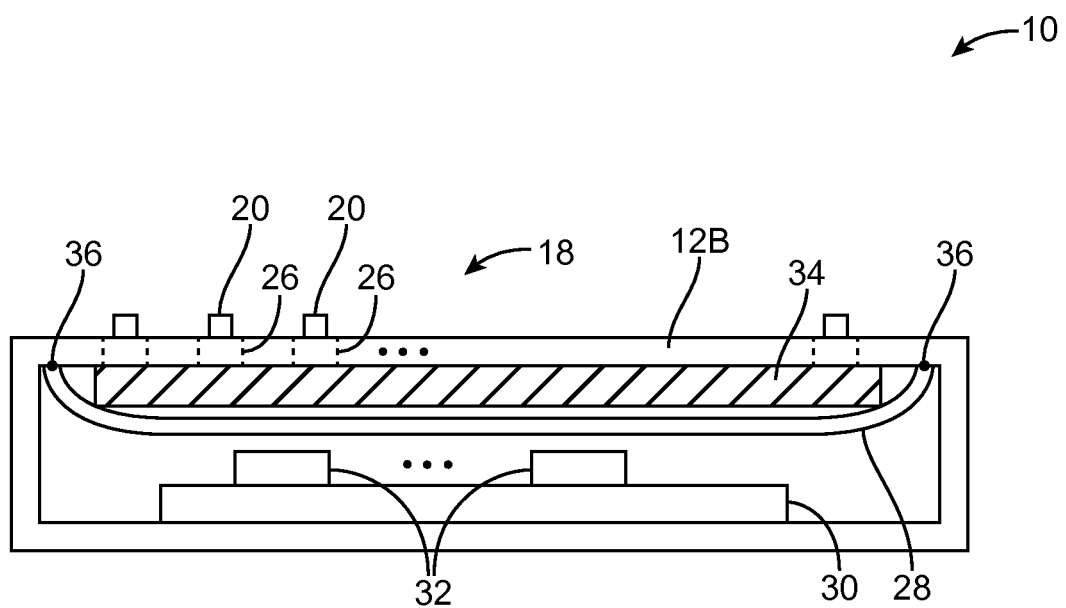
FIG. 4 is a cross-sectional side view of an electronic device housing having openings in which keyboard keys have been mounted and having an electromagnetic shielding layer in accordance with an embodiment of the present invention.

Electromagnetic signal shielding may be provided within housing 12B to reduce interference. FIG. 4 is a cross-sectional side view of base housing 12B in device 10. As shown in FIG. 4, device 10 may contain printed circuits such as printed circuit 30. Printed circuit 30 may be a rigid printed circuit board (e.g., a fiberglass-filled epoxy board) or may be a flexible printed circuit (e.g., a layer of polyimide or a sheet of other flexible polymer). Components 32 may be mounted on substrate 30. Components 32 may include integrated circuits such as processors, display driver integrated circuits, display timing chips, clocks, communications circuitry, graphics chips, and other circuits that have the potential to generate radio-frequency interference.

Keyboard 18 may be formed from key structures 20 that pass through openings 26. Keyboard structures 34 may include structures such as a metal support structure (sometimes referred to as a feature plate) that receives scissor springs for supporting keys 20, a polymer sheet that contains dome switches or other switches for keys 20, and a backlight unit for providing keyboard 18 with backlight.

To prevent interference from components 32 from reaching keyboard 18 and potentially passing through openings 26, an electromagnetic shielding structure such as shielding structure 28 may be interposed between the circuitry of components 32 and the circuitry of keyboard 18. Shielding structure 28 may be electrically shorted to housing 12 using electrical connections 36 (e.g., conductive adhesive, welds, solder, connectors, etc.).

Figure 5:
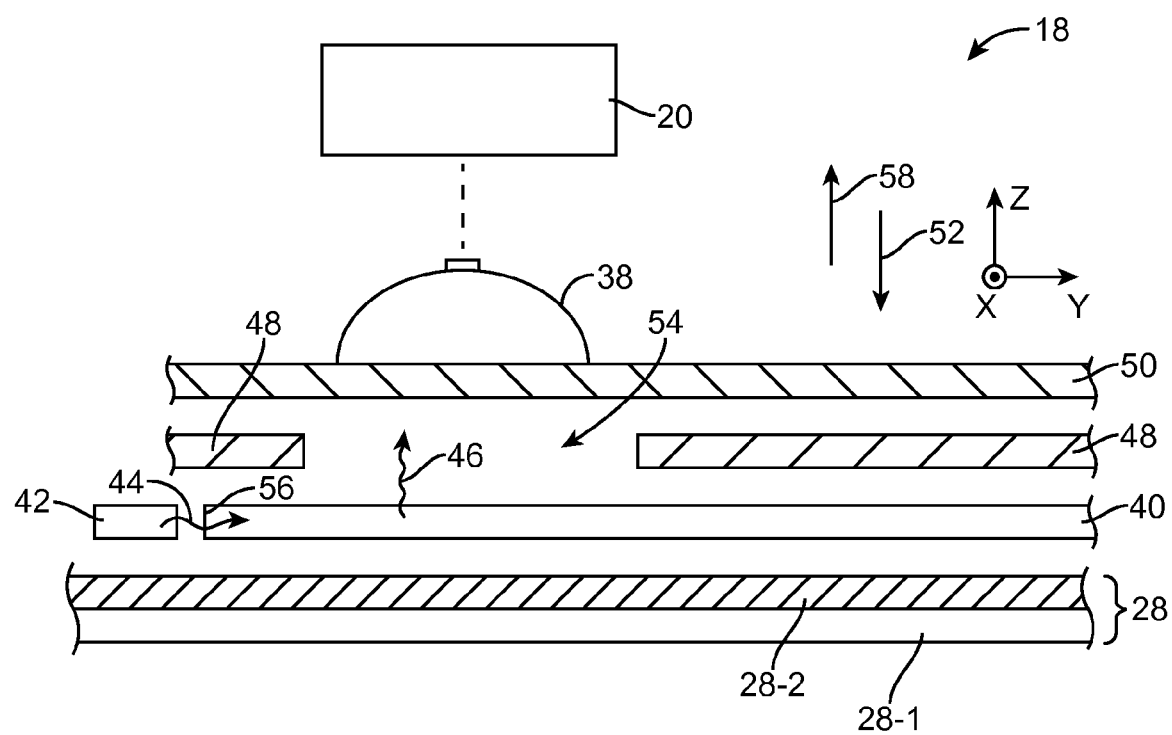
FIG. 5 is a cross-sectional diagram of an illustrative keyboard key dome switch mounted on a dielectric substrate and illuminated by backlight from a light guide plate in accordance with an embodiment of the present invention.

FIG. 5 is a cross-sectional side view of some of the internal structures associated with keyboard 18. As shown in FIG. 5, keyboard 18 may include switches such as dome switch 38. During operation of keyboard 18, a user may press key (key member) 20 downward in direction 52 to close switch 38. Control circuitry in keyboard 18 may be used to detect the operation of key 20.

Dome switch 30 may be mounted on a substrate such as substrate 50. Substrate 50 may be a dielectric layer such as a layer of polyester. Conductive traces (e.g., patterned metal lines) may be formed on substrate 50 to route keyboard signals to control circuitry in device 10 (e.g., control circuitry such as circuits 32 on board 30 of FIG. 4). Metal support structure 48 may be formed from a sheet of stainless steel, aluminum, or other metal. Support structure 48 (which may sometimes be referred to as a feature plate) may contain metal structures for supporting scissor springs associated with keys 20. Openings may be formed in support structures 48 such as opening 54. Feature plate openings 54 may be aligned with housing openings 26 and may be used to accommodate keyboard keys such as key member 20 of FIG. 5.

A backlight unit may be used to provide backlight for keyboard 18. The backlight unit may include a light source such as light source 42 and a light guide plate such as light guide plate 40. Light source 42 may be formed from one or more light-emitting diodes (as an example). Light guide plate 40 may be formed from a layer of clear plastic or other suitable material. During operation, light-emitting diodes 42 may emit light 44. Light 44 may be coupled into edge 56 of light guide plate 40. Due to the principal of total internal reflection, light guide plate 40 may distribute light 44 in lateral dimensions X and Y. Light 46 that is scattered upwards in direction 58 parallel to dimension Z may serve as backlight for keyboard 18. Light that is scattered downwards from light guide plate 40 in direction 52 may be reflected back upwards in direction 58 by reflector 28, thereby improving backlight efficiency.

Reflector 28 may serve as an electromagnetic shield that helps prevent radio-frequency interference signals from passing through openings 54 and 26 (FIG. 2). As shown in FIG. 5, reflector 28 may have a dielectric layer such as layer 28-1 and a metal layer (or other conductive layer) such as metal layer 28-2. Dielectric layer 28-1 may be formed from a material such as polyester or other flexible polymer.

Dielectric layer 28-1 may be a layer of polyester that is laminated to metal layer 28-2 (e.g., an aluminum layer, copper layer, or other metal layer). This example is merely illustrative. If desired, dielectric layer 28-1 and conductive layer 28-2 may be attached via any desired techniques. For example, conductive layer 28-2 may be a layer of metal deposited using deposition techniques such as chemical or physical deposition techniques.

Figure 6:
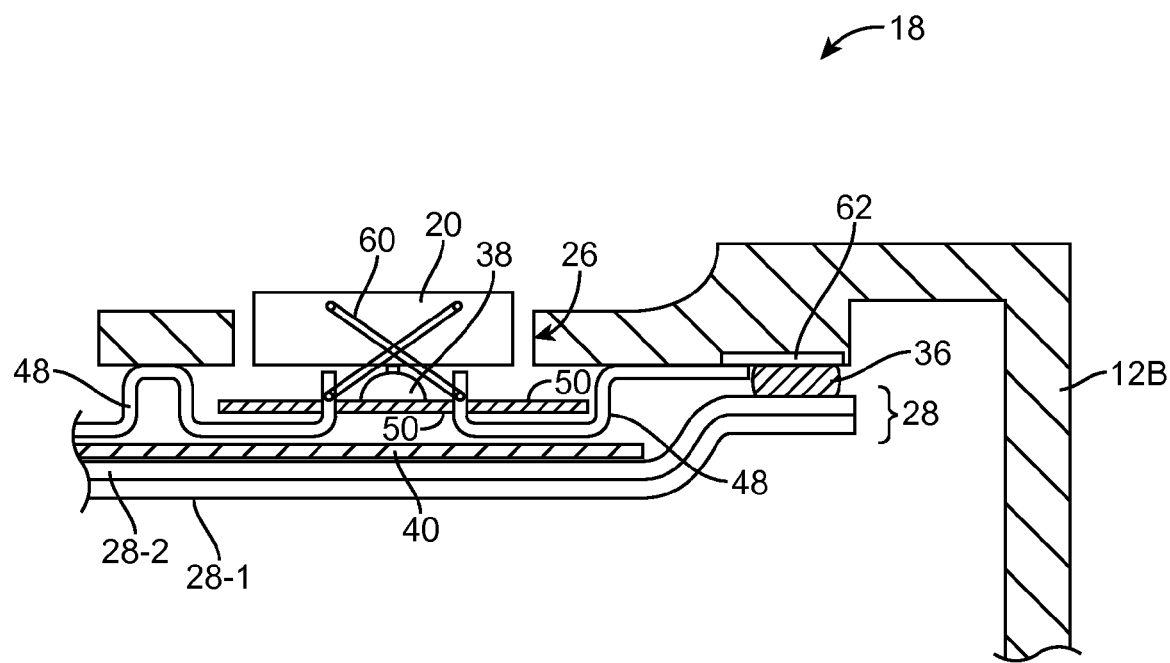
FIG. 6 is a cross-sectional side view of a keyboard formed from a metal electronic device housing showing how a metalized reflector for a backlight may be used in providing the keyboard with electromagnetic shielding in accordance with an embodiment of the present invention.

FIG. 6 is a cross-sectional side view of a portion of keyboard 18 showing how the components of FIG. 5 may be mounted within base housing 12B. As shown in FIG. 6, keyboard key member 20 may be mounted to support structures 48 using scissor mechanism 60. Reflector 28 may be shorted to housing 12B using electrical connection 36. In configurations in which housing 12B is formed from a conductive material such as aluminum, it may be desirable to form an oxide coating on housing 12B (e.g., by anodizing the surface of housing 12B to form an anodized coating). To facilitate the formation of a satisfactory electrical connection between metal layer 28-2 of layer 28 the oxide coating may be laser etched or otherwise removed from region 62 of housing 12B. Electrical connection 36 (e.g., a layer of conductive adhesive such as a conductive film or paste) may be used to form an electrical connection between housing 12B and metal shielding layer 28-2 of reflector 28.

Figure 7:
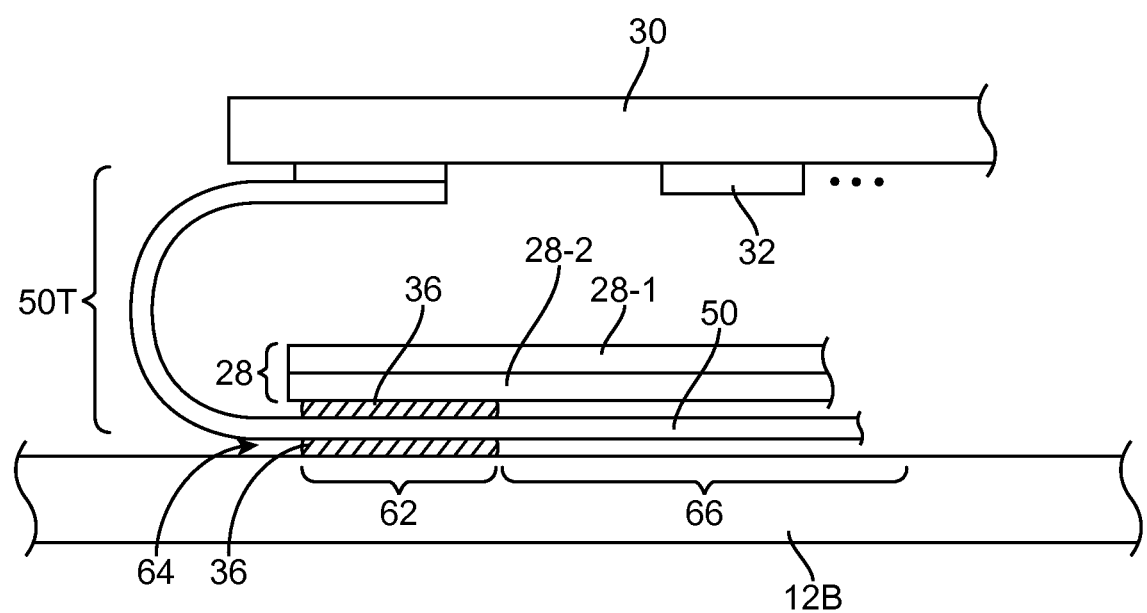
FIG. 7 is a cross-sectional side view of a dielectric layer with keyboard traces that has been mounted under a portion of a backlight reflector in accordance with an embodiment of the present invention.

FIG. 7 is a cross-sectional side view of a portion of device 10 in the vicinity of housing 12B showing how substrate 50 may have a portion such as tail portion 50T. Keyboard key switch structures such as dome switch 38 of FIG. 5 may be mounted to substrate 50 in main portion 66 of substrate 50. Main portion 66 of substrate 50 may be covered by shielding structure (reflector) 28. Metal layer 28-2 in shielding structure 28 may provide electromagnetic shielding for main portion 66 of substrate 50. Tail portion 50T may be an integral portion of substrate 50 that extends from under shield structure 28 via shield structure opening 64. Tail portion 50T may be connected to printed circuit board 30. Tail portion 50T may have a bend of e.g., 90 degrees, 180 degrees, or other suitable angles. Conductive adhesive 36 or other electrically conductive material may be used in forming a seal around tail portion 50T, thereby minimizing the area of the non-conductive portion of opening 64 and minimizing radio-frequency signal leakage out of the shielded area under shielding structure 28. Material 36 may, for example, include a first layer that is interposed between ground traces on substrate 50 and metal layer 28-2 and a second layer that is interposed between ground traces on substrate 50 and conductive housing 12B.

Figure 8:
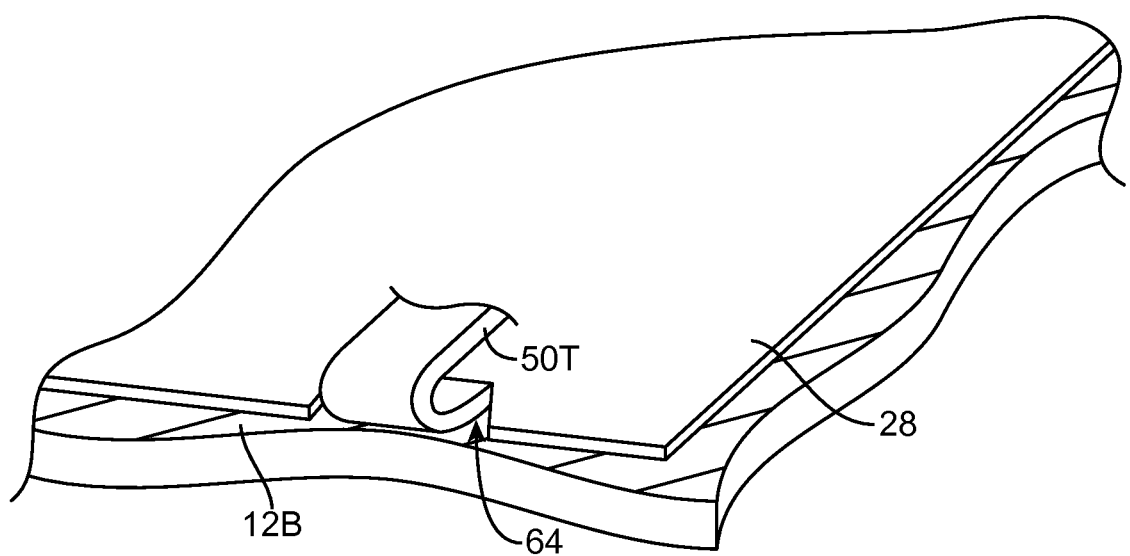
FIG. 8 is a perspective view of a flexible dielectric layer that contains keyboard traces protruding through an opening in a metalized backlight reflector layer that is being used to provide a keyboard with electromagnetic shielding in accordance with an embodiment of the present invention.

FIG. 8 shows how tail portion 50T of substrate 50 may protrude from under shielding structure 28 through opening 64 between shielding structure 28 and the inner surface of housing 12B.

Figure 9:
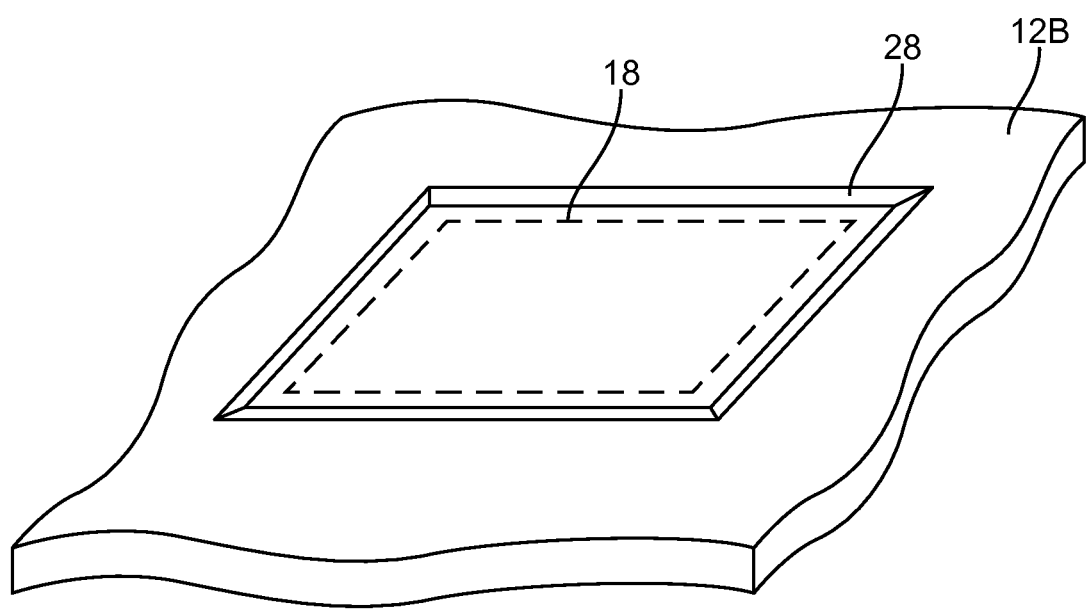
FIG. 9 is a perspective view of an illustrative rectangular backlight reflector that surrounds a keyboard in accordance with an embodiment of the present invention.

Shielding structure 28 may be formed having a substantially rectangular structure. FIG. 9 is an illustrative diagram of a rectangular shielding structure 28 that may help prevent electromagnetic interference from radiating through holes in housing 12B (e.g., holes 26). Shielding structure 28 may surround keyboard 18. Shielding structure 28 may be coupled to an interior (inner) surface of housing 12B along the periphery of the rectangular area occupied by shielding structure 28. For example, shielding structure 28 may be coupled to housing 12B at one or more edges of structure 28 via conductive adhesive, solder, welds, etc.

The example of FIG. 9 in which shielding structure 28 is substantially rectangular is merely illustrative. If desired, shielding structure 28 may be formed having any desired shape. For example, shielding structure 28 may be substantially square, trapezoidal, triangular, etc. Shielding structure 28 may, if desired, be formed having a shape corresponding to the shape of keyboard 18.

Figure 10A:
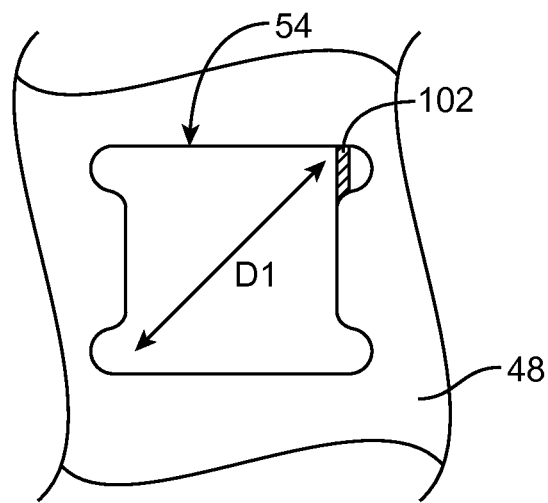
FIG. 10A is a diagram of an illustrative support structure having an opening that is bridged by a conductive path in accordance with an embodiment of the present invention.

If desired, keyboard support structures may be used to form shielding structures. FIG. 10A is an illustrative diagram in which conductive support structure (e.g., a metal support structure) may be used as a shielding structure. Conductive support structure 48 may include openings 54 (e.g., openings used to accommodate keyboard keys and/or button mechanisms). Openings 54 may be bridged using conductive paths such as path 102.

Path 102 may be formed as an integral part of support structure 48. For example, path 102 may be formed as part of a pattern used during a metal stamping process. Path 102 may serve to partition opening 54 into smaller openings while accommodating button mechanisms. Opening 54 having a bridging path 102 may be characterized by dimension D1. Dimension D1 may correspond to the largest partition formed via bridging path 102. Dimension D1 may be sufficiently small to help prevent radio-frequency interference generated by components from reaching antennas or sensitive communications circuitry. For example, dimension D1 may be sufficiently small in comparison to the wavelength of radio-frequency signals generated by components on device 10 so that the radio-frequency signals tend to be blocked by conductive support structure 48.

Figure 10B:
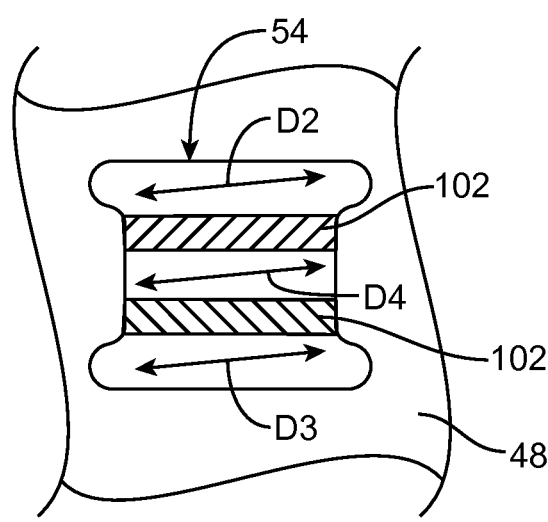
FIG. 10B is a diagram of an illustrative support structure having an opening that is bridged by multiple conductive paths in accordance with an embodiment of the present invention.

If desired, opening 54 may be bridged by multiple paths. FIG. 10B is an illustrative example showing how opening 54 of support structure 48 may be bridged by multiple paths 102. Opening 54 of FIG. 10B may be characterized by dimensions D2, D3, and D4 that are sufficiently small so that support structure 48 blocks radio-frequency interference from components on device 10.

The examples of FIGS. 10A and 10B in which bridging paths 102 are formed from vertical (FIG. 10A) and horizontal (FIG. 10B) conductive paths are merely illustrative. If desired, bridging paths 102 may be formed from paths having any desired shape. For example, paths 102 may be formed having one or more bends (e.g., 45 degree bends, 90 degree bends, or more). If desired, paths 102 may be formed having different widths. A given path may vary in width or shape along that path.

Figure 11:
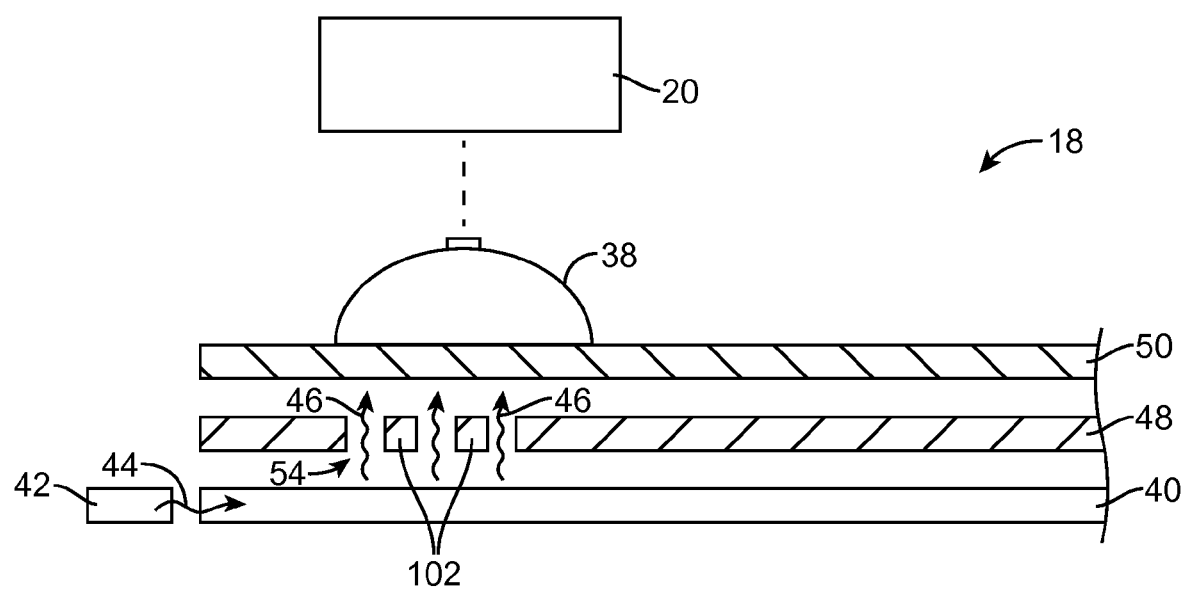
FIG. 11 is a cross-sectional view of an illustrative shielding support structure for a keyboard that may serve as a radio-frequency shielding structure in accordance with an embodiment of the present invention.

FIG. 11 is an illustrative cross-sectional diagram of a conductive support structure 48 that may serve as a shielding structure. As shown in FIG. 11, conductive support structure 48 may include bridging paths 102 that help to reduce the dimensions of opening 54 while ensuring that sufficient backlight 46 reaches button 20. Conductive support structure 48 having bridging paths 102 may sometimes be referred to herein as a shielding support structure, because structure 48 tends to block radio-frequency signals while providing support for substrate 50 and button mechanisms such as scissor mechanism 60.

Figure 12:
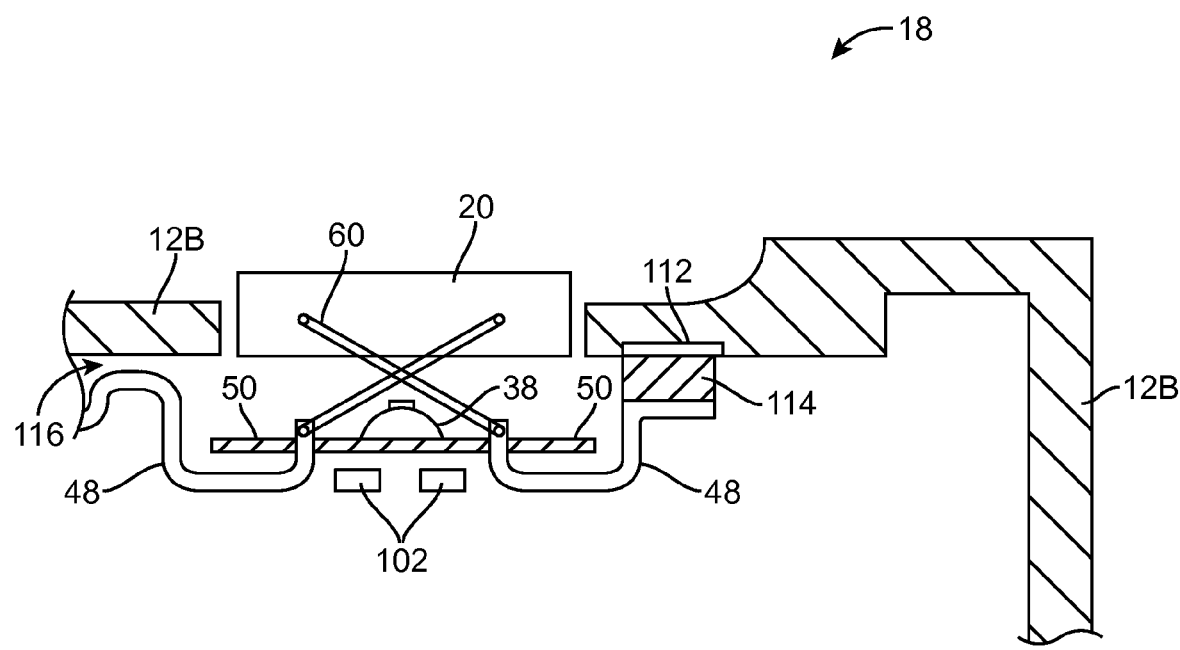
FIG. 12 is a cross-sectional diagram of an illustrative shielding support structure that is electrically coupled to an interior surface of a device housing portion in accordance with an embodiment of the present invention.

FIG. 12 is an illustrative cross-sectional diagram showing how a shielding support structure 48 may be electrically coupled to an interior surface of housing 12B (e.g., so that shielding support structure 48 is grounded to housing 12B). As shown in FIG. 12, shielding support structure 48 may be coupled to region 112 of support structure 48 via electrical connections 114 (e.g., conductive adhesive, welds, solder, connectors, etc.). Shielding support structure 48 may be coupled to region 112 using electrical connections 114 using techniques similar to those used to electrically couple shielding structure 28 of FIG. 6 to region 62 of housing 12B (e.g., by removing an oxide coating from region 112). Shielding support layer 48 may be electrically coupled to regions 112 along the periphery of display 18. If desired, shielding support layer 48 may be electrically coupled to housing 12B at any desired location such as location 116.

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device, comprising:
   a conductive housing having opposing inner and outer surfaces and having openings;
   keys in the openings;
   a conductive electromagnetic shielding structure that extends under all of the openings; and
   a light guide plate interposed between the conductive electromagnetic shielding structure and the keys, wherein the light guide plate is configured to distribute backlight to the keys in the openings, wherein the light guide plate covers the openings on the inner surface of the housing, and wherein the conductive electromagnetic shielding structure reflects the backlight towards the keys in the openings, wherein the conductive electromagnetic shielding structure comprises a dielectric layer and a metal layer and wherein the metal layer is configured to reflect the backlight towards the keys in the openings wherein the conductive structures comprise conductive adhesive.

2. The electronic device defined in claim 1 wherein the conductive housing comprises a metal housing.

3. The electronic device defined in claim 2 further comprising a conductive adhesive that is interposed between at least part of the metal layer and the metal housing to short the metal layer to the metal housing.

4. The electronic device defined in claim 1 wherein the conductive housing has a first portion and a second portion that are attached by a hinge structure and wherein the openings are formed in the second portion.

5. The electronic device defined in claim 1 further comprising a metal plate structure with openings that are aligned with the openings in the conductive housing.

6. The electronic device defined in claim 5 further comprising scissor structures that attach the keys to the metal plate structure.

7. An electronic device, comprising:
   a display housing;
   a display mounted in the display housing;
   a base housing coupled to the display housing for rotational motion about a rotational axis;
   a keyboard in the base housing, wherein the base housing has openings and wherein the keyboard comprises keys that are configured to move within the openings;
   backlight structures that are configured to provide backlight for the keyboard, wherein the backlight structures comprise at least one layer of metal that is configured to serve as an electromagnetic shield for the keyboard, wherein the backlight structure comprises a layer of plastic and a metal coating on the layer of plastic, wherein the layer of metal is interposed between the layer of plastic and the keys, and wherein the backlight structure has a rectangular periphery; and
   conductive structures that are configured to electrically couple the metal coating layer to the base housing along the rectangular periphery.

8. The electronic device defined in claim 7 wherein the base housing comprises a metal housing.

9. The electronic device defined in claim 8, wherein the conductive adhesive is in direct contact with both the metal coating layer and the metal housing.

10. The electronic device defined in claim 7, wherein the conductive structures are in direct contact with the metal coating layer and the base housing.

11. An electronic device, comprising:
    a conductive housing having opposing inner and outer surfaces and having openings that extend from the inner surface to the outer surface;
    keys in the openings;
    a metal support structure with openings that are aligned with the openings in the inner surface of the housing, wherein the openings in the metal support structure are each bridged by at least one conductive path; and
    a light guide plate configured to distribute backlight to the keys in the openings.

12. The electronic device defined in claim 11, further comprising a conductive electromagnetic shielding structure configured to reflect the backlight towards the keys.

13. The electronic device defined in claim 12, further comprising a substrate between the conductive electromagnetic shielding structure and the inner surface of the housing, wherein the substrate has a portion that is electrically connected to the conductive electromagnetic shielding structure and the housing.

14. The electronic device defined in claim 13, further comprising key switch structures mounted on the substrate.

15. The electronic device defined in claim 13, further comprising a printed circuit board, wherein the substrate has a tail portion connected to the printed circuit board.

16. The electronic device defined in claim 11, further comprising at least one antenna structure in a clutch barrel between upper and lower portions of the housing.

17. The electronic device defined in claim 16, further comprising:
    a conductive electromagnetic shielding structure configured to reflect the backlight towards the keys; and
    a printed circuit board having circuit components wherein the conductive electromagnetic shielding structure provides electromagnetic shielding between the circuit components and the at least one antenna structure.

* * * * *